(No Model.)
W. WARD.
CAR WHEEL.
No. 472,415.  Patented Apr. 5, 1892.
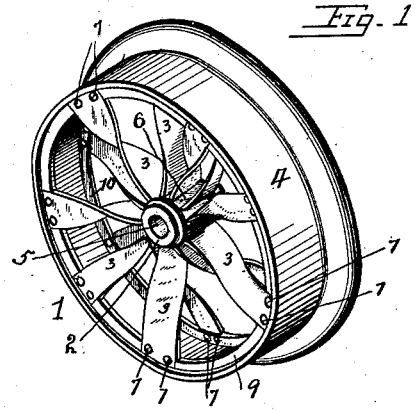
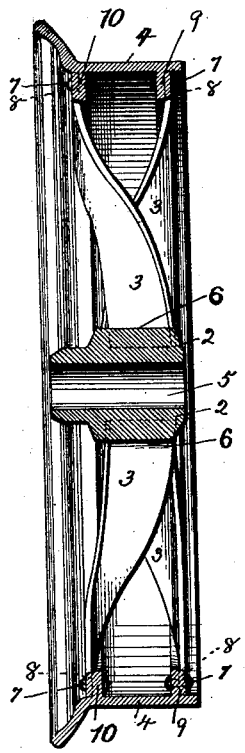
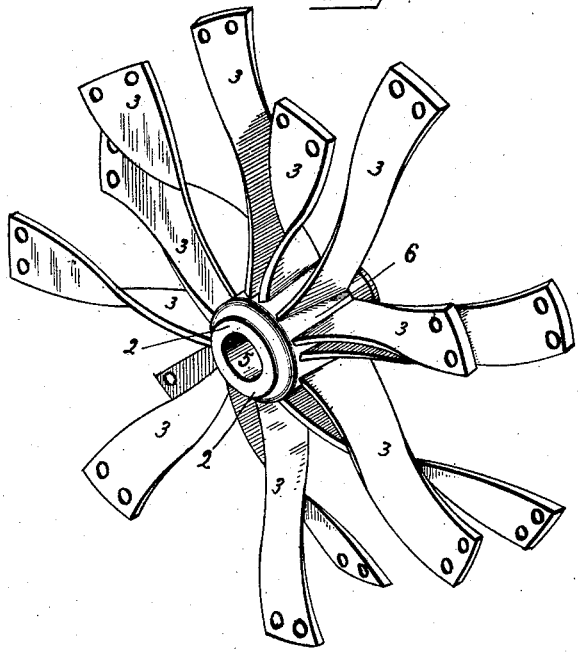
Witnesses
Inventor
Wilfred Ward
By his Attorneys,
C. A. Snow & Co.

UNITED STATES PATENT OFFICE.

WILFRED WARD, OF BUDA, ILLINOIS.

CAR-WHEEL.

SPECIFICATION forming part of Letters Patent No. 472,415, dated April 5, 1892.

Application filed December 24, 1891. Serial No. 416,063. (No model.)

*To all whom it may concern:*

Be it known that I, WILFRED WARD, a citizen of the United States, residing at Buda, in the county of Bureau and State of Illinois, have invented a new and useful Car-Wheel, of which the following is a specification.

The invention relates to improvements in car-wheels.

The object of the present invention is to simplify and improve the construction of car-wheels, to lessen their cost of manufacture, to increase their strength, durability, and rigidity, and to gain the requisite weight.

The invention consists in the construction and novel combination and arrangement of parts hereinafter fully described, illustrated in the accompanying drawings, and pointed out in the claims hereto appended.

In the drawings, Figure 1 is a perspective view of a wheel constructed in accordance with this invention. Fig. 2 is a transverse sectional view. Fig. 3 is a perspective view of the hub and spokes, the rim being detached.

Like numerals of reference indicate corresponding parts in all the figures of the drawings.

1 designates a wheel composed of a hub 2, spokes 3, which are cast into the hub, and a rim 4, to which the outer ends of the spokes are secured. The hub is cylindrical and is provided with a central opening 5 to receive an axle, and its outer face is rounded at 6. The spokes 3 are cast into the hub and extend the width of the rounded portion 6, and they are arranged at an angle to the hub and extend therefrom alternately to the outer and inner edges of the rim 4. The inner ends of the spokes 3 are arranged at a slight angle to each other, and the outer ends of the spokes are secured by bolts or rivets 7 in recesses 8 of annular flanges 9 and 10, formed integral with the rim and arranged on the inner face of the same and adjacent to the inner and outer edges thereof. The spokes have nearly a quarter-twist, which extends throughout the length of the spoke, the twist being slightly less than one-quarter in consequence of the inner ends being arranged at a slight angle to one another instead of parallel. This construction produces a strong, rigid, and durable wheel, the spokes, owing to their particular construction and arrangement, being exceedingly stiff, and the wheel may be cheaply constructed and does not necessitate the employment of expert workmen.

What I claim is—

1. In a wheel, the combination of a rim, a hub, and spokes having their inner ends cast in the hub and their outer ends alternately secured near the inner and outer edges of the rim, the spokes being provided with nearly a quarter-twist extending throughout their length, substantially as described.

2. In a wheel, the combination of a rim provided on its inner face with annular flanges arranged adjacent to the inner and outer edges, a hub, and spokes provided throughout their length with nearly a quarter-twist and having their inner ends cast in the hub and arranged at an angle to the same and to one another, said spokes having their outer ends secured to the flanges of the rim, substantially as described.

In testimony that I claim the foregoing as my own I have hereto affixed my signature in the presence of two witnesses.

WILFRED WARD.

Witnesses:
S. TOOMEY,
H. C. TURNER.